United States Patent
Ziefle et al.

(10) Patent No.: US 10,093,164 B2
(45) Date of Patent: Oct. 9, 2018

(54) HYBRID MODULE DESIGNED AS AN INSERTABLE MODULE

(71) Applicant: Schaeffler Technologies AG & Co. KG, Herzogenaurach (DE)

(72) Inventors: Florian Ziefle, Freudenstadt (DE); Stefan Mackowiak, Malsch (DE); Felix Vogel, Sinzheim (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/308,760

(22) PCT Filed: Jun. 10, 2015

(86) PCT No.: PCT/DE2015/200354
§ 371 (c)(1),
(2) Date: Nov. 3, 2016

(87) PCT Pub. No.: WO2015/188826
PCT Pub. Date: Dec. 17, 2015

(65) Prior Publication Data
US 2017/0136869 A1    May 18, 2017

(30) Foreign Application Priority Data
Jun. 13, 2014  (DE) ................. 10 2014 211 297

(51) Int. Cl.
*B60K 6/40*   (2007.10)
*B60K 6/387*  (2007.10)
*B60K 6/405*  (2007.10)

(52) U.S. Cl.
CPC ............ *B60K 6/405* (2013.01); *B60K 6/387* (2013.01); *B60Y 2200/92* (2013.01);
(Continued)

(58) Field of Classification Search
CPC .......... B60K 6/40; B60K 6/405; B60K 6/387; B60K 2006/4825; F16D 2500/1021
See application file for complete search history.

(56) References Cited

U.S. PATENT DOCUMENTS 5,821,653 A    10/1998  Kinto et al.
6,533,696 B1 *  3/2003  Takenaka ................ B60K 6/26
                                                180/65.235
(Continued)

FOREIGN PATENT DOCUMENTS

CN    102046408 A    5/2011
DE    102005011888   11/2005
(Continued)

*Primary Examiner* — Frank Bennett Vanaman
(74) *Attorney, Agent, or Firm* — Volpe and Koenig. P.C.

(57) ABSTRACT

The invention relates to a hybrid module including a clutch that includes a clutch actuator, also including an electric machine, an internal combustion engine end and a transmission end. The hybrid module is designed as a pre-assembled insertable module to be inserted into a transmission housing, and an actuator electronics module is already pre-mounted on the hybrid module. The invention further relates to a method for assembling a hybrid module, characterized in that the following step is carried out: —pre-assembling the hybrid module as an insertable module, an actuator electronics module being pre-mounted on the hybrid module.

10 Claims, 4 Drawing Sheets

(52) U.S. Cl.
CPC ... *F16D 2500/1021* (2013.01); *Y10S 903/914* (2013.01); *Y10S 903/951* (2013.01); *Y10S 903/952* (2013.01)

(56) References Cited

U.S. PATENT DOCUMENTS

| | | | |
|---|---|---|---|
| 8,585,541 | B2 | 11/2013 | Mueller |
| 9,391,496 | B2 * | 7/2016 | Triantos .................. H02K 13/00 |
| 2003/0054913 | A1 * | 3/2003 | Sayama .................. B60K 6/26 475/203 |
| 2004/0124722 | A1 | 7/2004 | Uchida et al. |
| 2004/0206558 | A1 * | 10/2004 | Kabasawa ............... B60K 6/26 180/65.25 |
| 2004/0226761 | A1 * | 11/2004 | Takenaka ............... B60K 6/365 180/65.1 |
| 2005/0110278 | A1 * | 5/2005 | Fan .......................... B60K 6/26 290/40 A |
| 2005/0167231 | A1 * | 8/2005 | Kurmaniak ........... F16D 27/115 192/84.7 |
| 2005/0204537 | A1 | 9/2005 | Reed et al. |
| 2006/0289209 | A1 | 12/2006 | Grosspietsch et al. |
| 2008/0093135 | A1 | 4/2008 | Nomura et al. |
| 2009/0206709 | A1 * | 8/2009 | Kakuda .................. B60K 6/405 310/68 D |
| 2009/0251018 | A1 * | 10/2009 | Koshida .................. B60K 6/26 310/89 |
| 2010/0270874 | A1 | 10/2010 | Stervik et al. |
| 2011/0039649 | A1 | 2/2011 | Tanae et al. |
| 2011/0118070 | A1 | 5/2011 | Purretat et al. |

FOREIGN PATENT DOCUMENTS

| | | |
|---|---|---|
| DE | 102008040493 | 1/2010 |
| DE | 102011078125 | 12/2012 |
| EP | 1049235 A2 | 11/2000 |
| EP | 1736345 | 12/2006 |
| WO | 2015078462 | 6/2015 |
| WO | 2015078464 | 6/2015 |

\* cited by examiner

HYBRID MODULE DESIGNED AS AN INSERTABLE MODULE

BACKGROUND

The invention relates to a hybrid module for hybrid-driven machines, particularly for vehicles with a hybrid drive, having a combination of an electric machine and an internal combustion engine.

Such hybrid modules are shown in the valuable, previously unpublished contributions to prior art with the application numbers PCT/DE2014/200613 and PCT/DE2014/200620, with these modules comprising a separate housing and with a power module being fastened at a component of the hybrid module.

Such a hybrid module is supported via its own housing between the internal combustion engine and the transmission. This way, all connections can be fastened at the exterior of the housing of the hybrid module. Furthermore, in order to control the clutch actuator here a control device is provided at the exterior of the housing and contacted respectively by a plug of the cable harness of the vehicle and by the clutch actuator. In the final assembly, which occurs usually at a different production site, after the integration of the hybrid module only the plug-in connections need to be closed.

A hybrid module is known from DE 10 2011 078 125 A1 in which a position detector is fastened radially at the outside of the hybrid module. This position detector cooperates with a locator connected to the shifter of the clutch of the hybrid module. When the hybrid module is installed in the transmission housing the contacting of the actuator electronics is therefore very complex, because no easy access thereto is possible.

The inventors have defined the objective to further develop the achievements of prior art. In particular, a hybrid module shall be provided which can be installed in a vehicle in a space-saving and/or efficient manner using alternative assembly steps.

SUMMARY

The objective is particularly attained in a hybrid module with a clutch comprising a clutch actuator and an electric machine, an internal combustion engine side, and a transmission side, with the hybrid module being embodied as a pre-assembled insertable module to be inserted into a transmission housing and an actuator electronics module already being preassembled at the hybrid module. The actuator electronics module is here pre-assembled via a fastening at the hybrid module such that it is radially distanced from the hybrid module, which distance being sized such that in the installed state the hybrid module is arranged inside the transmission housing and the actuator electronics module outside thereof.

In particular, with regards to the transmission housing it can here be distinguished between a dry chamber and a wet chamber. The actual transmission is arranged in the wet chamber, while the dry chamber or also the clutch bell serves for receiving a clutch or for receiving a hybrid module comprising a clutch. In the present case the hybrid module is preferably installed in the dry chamber of the transmission housing.

In one embodiment of the invention it is provided to nest the hybrid module, the transmission housing, and the actuator electronics module at least sectionally in the radial and the axial direction. This means that for example sections of the transmission housing are positioned radially between the hybrid module and the actuator electronics module.

The objective is further attained particularly in a method for the assembly of a hybrid module, with here the following step being performed:

Pre-assembling the hybrid module as an insertable module, with the actuator electronics module being pre-assembled at the hybrid module.

This way it is possible to use a transmission housing as the casing, which preferably has an appropriately sized housing attachment for receiving the insertable module. Simultaneously it is possible by the pre-assembly of the actuator electronic module at the hybrid module to provide wiring or plug-in connections so that no loose cable ends need to be protected, because they are not present. Further, a separate transportation of the actuator electronics module to the assembly site and the subsequent allocation to the correct hybrid module is omitted after the transportation (e.g., when an actuator electronics module is calibrated to a certain hybrid module and/or a functions test is performed before delivery to the final place of assembly). The assembly expense after the transportation to the place of assembly is reduced, because there the fastening and wiring of the actuator electronics module is waived. The disassembly expense after calibration or after testing the actuator electronics module and the hybrid module before transportation is waived as well, because the actuator electronics module can be left at the hybrid module.

In the following, the use of the terms radial and axial relates to the rotor axis of the hybrid module.

The electric machine comprises preferably a rotor in which the clutch is integrated.

When embodied as an insertable module, the hybrid module is preferably formed as a housingless one, i.e. embodied without a housing surrounding the hybrid module. Thus, preferably no separate housing is provided for the hybrid module. During the final assembly, which occurs at a different production site, the module is inserted into the transmission housing provided there (insertable module).

The actuator electronics module preferably comprises the electronics or parts of the electronics required for operating the clutch actuator. It represents an actuator control device, for example. It is preferably assembled at a fixed part of the housingless hybrid module.

After the preassembly of the hybrid module as an insertable module and the preassembly of the actuator electronics module at the hybrid module preferably an (electronic) calibration occurs of the actuator electronics module at this hybrid module.

Preferably, after the preassembly an insertion and fastening of the hybrid module can occur in a transmission housing, particularly in a dry chamber of the transmission and/or in the clutch bell, and further preferred a connection of at least one sensor and/or actuator cable to the actuator electronics module. This can occur in a particularly simple fashion when it is provided that the actuator module, the hybrid module, and the transmission housing are arranged at least sectionally in an axially and radially nested fashion. The actuator module may have other plug-in connections, which can be connected to respectively complementary plug-in connections of the wiring harness of the drivetrain. Due to the fact that the actuator module is located outside the drivetrain housing the combination and contacting of the appropriate connection parts can be performed easily.

In another method according to the invention, preferably an electric calibration and/or preferably an electric functions test of the actuator electronics module is performed together with the hybrid module before or after the preassembly.

This allows an adaptation or a test of the then finished insertable module by the pre-installer. This considerably improves the quality and functionality of the hybrid module. Here, based on the preassembly of the actuator electronics module and the hybrid module a fixed allocation of the adapted/tested actuator electronics module to the hybrid module is given and thus a renewed allocation by the final installer is not required. This excludes any mix-ups. For example, the actuator electronics module is only connected to the hybrid module via the necessary cables for a functions test or a calibration before the pre-assembly. Here the actuator electronics module can be arranged on a test bed, for example. Then calibration and/or a functions test are performed. Thereafter the actuator electronics module is preassembled at the hybrid module. Alternatively the pre-assembly of the actuator electronics module at the hybrid module can occur first, including the connection of the necessary cables. Then the calibration occurs and/or the functions test.

In another hybrid module according to the invention the actuator electronics module is fastened at a radially extending wall at the side facing the internal combustion engine, preferably indirectly, particularly preferred directly. In another method according to the invention the preassembly of the actuator electronics module occurs at a radially extending wall at the side of the internal combustion engine.

This way any potentially remaining structural space, e.g., between a vibration damper and an electric machine, can be utilized in order to assemble the actuator electronics module.

The radially extending wall is preferably a component extending between a radially outer point and a radially inner point, with its radial extension being greater than the axial extension. Here, a radial extension is understood also as an essentially radially extension, i.e. in the extreme case for example that the angle between the axis and the radial housing section is greater than 45°. The radially extending wall is preferably arranged at the side of the internal combustion engine axially next to the electric machine. Here it is particularly understood that coming from the side of the internal combustion engine in the axial direction first the radially extending wall is arranged and then the electric machine. Preferably the radially extending wall has an opening for passing a shaft through it (e.g., rotor shaft or driveshaft, or shaft between the clutch and the vibration damper). It is particularly preferred when the opening comprises a bearing, e.g., a roller bearing with one or more rows, which supports the shaft rotationally in reference to the housing section. Preferably the hybrid module comprises a vibration damper and the wall is axially arranged as an intermediate wall between the vibration damper on the one side and the electric machine and/or the clutch on the other side. Preferably the wall is a separating wall (preferably with sealing effects in the assembled state of the insertable module) between the electric machine with the clutch and a vibration damper (preferably a torsional vibration damper).

Preferably the clutch actuator is indirectly or preferably directly supported at the wall. For example the clutch actuator may be an electronic central shifter. The support of the clutch actuator occurs preferably via a support device, it is particularly preferred when the support device of the clutch actuator is an integral component of the wall. For example, a support device of an electronic central shifter and the radially extending wall are arranged as a single component, e.g., as an intermediate wall between a vibration damper and the electric machine.

A direct fastening of the actuator electronics module at the wall is e.g., a direct screw connection of the housing of the actuator electronics module or a circuit board of the actuator electronics module, an indirect fastening, e.g., a fastening via a holder.

In another hybrid module according to the invention the actuator electronics module is fastened at the hybrid module via a holder, which has at least one brace with a radially extending area, with said brace being connected at its one end section to the hybrid module and with its other end section to the actuator electronics module, preferably in an indirect fashion, particularly preferred directly. In another method according to the invention the actuator electronics module is fastened via an appropriate holder at the hybrid module.

This way the actuator electronics module can be adapted via the appropriate embodiment of the holder to the structural space available in the installation situation (e.g., the respective vehicle type). Preferably the actuator electronic module is arranged via the holder at a position radially outside the perimeter of the stator or perhaps in cooling channels provided inside the stator, particularly preferred radially outside the exterior perimeter and/or the exterior contour of the transmission housing into which the hybrid module shall be inserted.

The holder serves preferably for the fastening of the actuator electronics module and preferably of connectors at the exterior of the transmission housing. The holder has its base preferably at the radial wall and/or at the stator or the cooling channel of the electric machine. The actuator electronics module is preferably screwed via screws to the holder, e.g., an assembly plate (e.g., a support plate) of the holder. Preferably one or more threads are integrated directly in the plate or one or more embossed nuts are provided. The holder preferably comprises a steel sheet with a preassembled actuator electronics module, which is fastened via two screws at the erected part of the hybrid module. Preferably the holder is fixed to the transmission housing with two additional screws after the insertion of the hybrid module. As an alternative to a steel sheet, the holder is preferably embodied as a cast aluminum part. Particularly preferred the holder is formed in one piece with the radially extending wall, e.g., as a cast part.

A brace is preferably a one-piece component (steel sheet), however it is also possible to compose the brace from several parts.

The radially extending area of the brace is preferably an area which extends between a radially outer point and a radially inner point and with its radial extension being greater than the axial extension. Here, a radial extension is also understood as an essentially radial extension, i.e. in the extreme case for example an angle between the axis and the radial housing section being greater than 45°. The radially extending section of the brace is preferably the boundary between the end section of the brace, by which the brace is or will be connected to the hybrid module, and the other end section of the brace, by which the brace is or will be connected to the actuator electronics module. Preferably the transmission housing comprises recesses at the edge of the opening of the transmission housing matching the position of the brace or the braces. The edge of the opening defines preferably the opening into which the hybrid module is inserted.

It is particularly preferred when the holder comprises two or more such braces. The features of one brace mentioned in this description shall also apply preferably to the second brace or any other braces.

The brace is fastened at an end section of the hybrid module, e.g., via a screw connection. For this purpose one end section comprises e.g., a fastening option, perhaps in the form of a bore. Preferably the brace is angled in the proximity of the bore. Preferably the brace is directly connected at one end section to the radially extending wall. One end section preferably represents the radial inner end section of the brace.

The brace is fastened at its other end section to the actuator electronics module, e.g., via an assembly plate, for example screwed thereto, with the brace transitioning to its other end section. Preferably the other end section represents the radially exterior end section of the brace.

In another hybrid module according to the invention the other end section or a section of the holder adjoining it or the actuator electronics module comprises a fastening option, preferably several fastening options, for fastening at the transmission housing. In another method according to the invention, after the insertion of the hybrid module into the transmission housing, the other end section or a holder adjoining said section or the actuator electronics module is fastened at the transmission housing, preferably directly.

This way the otherwise freely suspended end of the holder with the assembled actuator electronics module can be fixed at the transmission housing after the assembly of the insertable module in said transmission housing. A fastening option is embodied e.g. as a bore, a thread, an (angled) brace comprising a bore.

In another hybrid module according to the invention the brace comprises at one end section an axially extending area, which transfers into the radially extending section.

This way an axially extending section can be overcome, which is given between the assembly site of the holder at the hybrid module and the opening edge of the transmission housing in the installed state of the hybrid module. The brace transfers from the axial area into the radial one, preferably via an angled portion of the brace.

The axially extending section is preferably a section which extends between two axially distanced points and with its radial extension being smaller than the axial extension. Here, an axial extension is also understood as an essentially axial extension, i.e. in the extreme case for example that the angle between the axis and the radial housing section is smaller than 45°.

In another hybrid module according to the invention the holder comprises an axially extending section radially outside the exterior perimeter of the hybrid module, with the radially extending sections merging therein.

This way an axial positioning of the actuator electronics module can be adjusted to the spatial conditions given outside the transmission housing. The axially extending section is in turn an area which extends between two axially distanced points and with its radial extension being smaller than the axial extension. Here, an axial extension is also understood as an essentially axial extension, i.e. in the extreme case for example that the angle between the axis and the radial housing section is smaller than 45°.

Preferably outside the exterior perimeter of the transmission housing the holder comprises the axially extending section. The axially extending section can e.g., be formed by the brace, which transfers from its radially extending section for example via an angled portion into the axially extending area or via an assembly plate (e.g., a carrier steel plate), which adjoins the brace (or the braces) or by an area of the actuator electronics module housing, which then can be considered a part of the holder.

Preferably the axially extending section is arranged outside the external perimeter of the hybrid module axially at approximately the same axial height as the axially extending section at the end section of the brace, which is fastened at the hybrid module. Preferably the holder overall is approximately U-shaped, e.g., via an appropriately double-angled brace.

In another hybrid module according to the invention the brace has a grommet which is preferably arranged in the radially extending section of the brace. In another method according to the invention a grommet is arranged accordingly.

This way, during the final assembly and without any considerably higher expense a preassembled sealing of the holder passage at the edge of the transmission opening can be yielded. Preferably the brace is encased by the grommet. The grommet has a sealing function, here, in order to protect the interior of the hybrid module from contaminants. Preferably, cables are guided through bores in the grommet and this way protected from mechanic influences (e.g., chafing). The grommets therefore have an additional purpose to guide the cables from the hybrid module to the external part of the terminal and to protect them from mechanic influences. Preferably every brace has a grommet. A grommet is preferably fastened via an undercut or a lug at the brace.

In another hybrid module according to the invention at least one cable is guided along the brace from the hybrid module to the actuator electronics module. In another method according to the invention at least one cable is laid accordingly.

This way any wiring expense is omitted during the final assembly. The placement along the brace is further advantageous in that the cables are protected during transportation and then during the assembly of the insertable module in the transmission housing they are automatically guided with the brace out of the transmission housing and also already connected to the actuator electronic module. Preferably the cable is laid radially outside the brace along the axially extending section of the brace at which an end section is provided (where the brace is connected to the hybrid module). This way the cable is protected by the brace from the rotating vibration damper. Preferably the cable is laid along the exterior axial section of the holder radially inside the holder, protecting the cable from damages by potentially present other vehicle parts arranged perhaps near the transmission housing.

Preferably several cables are laid that way.

In another hybrid module according to the invention at least one plug-in component is fastened preferably indirectly, particularly preferred directly at the other end section or at an area of the holder abutting it or at the actuator electronic module. In another method according to the invention at least one plug-in component is fastened accordingly.

This allows a quick connection of the hybrid module after the assembly in the transmission housing. Additionally, here any dangling cables or connectors are avoided, which might be damaged during transportation.

A plug-in connection component is for example a plug or a socket. For example a socket for a rotor position sensor is fastened on an assembly plate, which abuts one or more braces, and one or more sockets are integrated in the housing of the actuator electronics module. Particularly preferred the plug-in connection components are at least partially arranged over top of each other, allowing to save radial structural space. Preferably they are arranged such that they have a common plug-in direction. Alternatively the plug-in connection components are arranged at two different sides of the holder such that they have opposite plug-in directions, thus here too a radially low structural design develops.

BRIEF DESCRIPTION OF THE DRAWINGS

The invention is now explained in the form of examples based on the figures. Shown here are:

FIG. 2B shows the holder in the preassembled state with the hybrid module, and FIG. 2C shows the holder in the state assembled in the transmission housing, FIGS. 3A-3C a holder in the state assembled in the transmission housing similar to the one of FIGS. 2A-2C, however only comprising one brace, with FIG. 3A showing a perspective view of the holder diagonally from the side of the internal combustion engine.

DETAILED DESCRIPTION OF THE PREFERRED EMBODIMENTS

Figure 1:
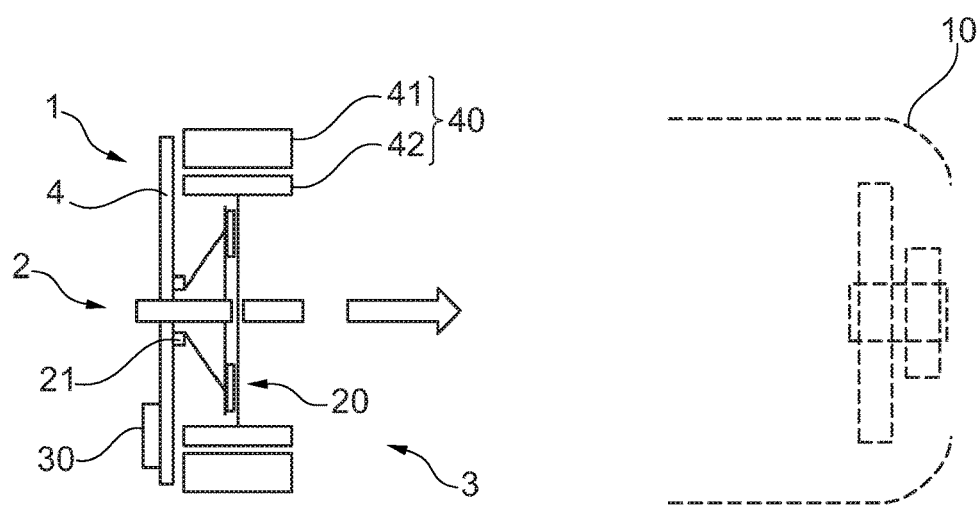
FIG. 1 a hybrid module according to the invention.

FIG. 1 shows a hybrid module 1 according to the invention. It comprises a clutch 20 with a clutch actuator 21, an electric machine 40, an internal combustion engine—side 2, and a transmission side 3. It is embodied as a preassembled insertable module for insertion in a transmission housing 10 and an actuator electronic module 30 is already preassembled at the hybrid module 1. The electronic machine 40 comprises here a rotor 42, in which the clutch 20 is integrated, and a stator 41.

In order to assemble the hybrid module 1 it is preassembled as an insertable module, with the actuator electronics module 30 already being preassembled at the hybrid module 1.

This ensures the facilitation during the final assembly mentioned at the outset and the increased security during transportation.

In this example additionally a direct fastening of the actuator electronics module 30 is shown at the hybrid module. It is fastened at a wall 4, radially extending at the side of the internal combustion engine, which is located at the side of the internal combustion engine axially next to the electric machine 40.

Figure 2A:
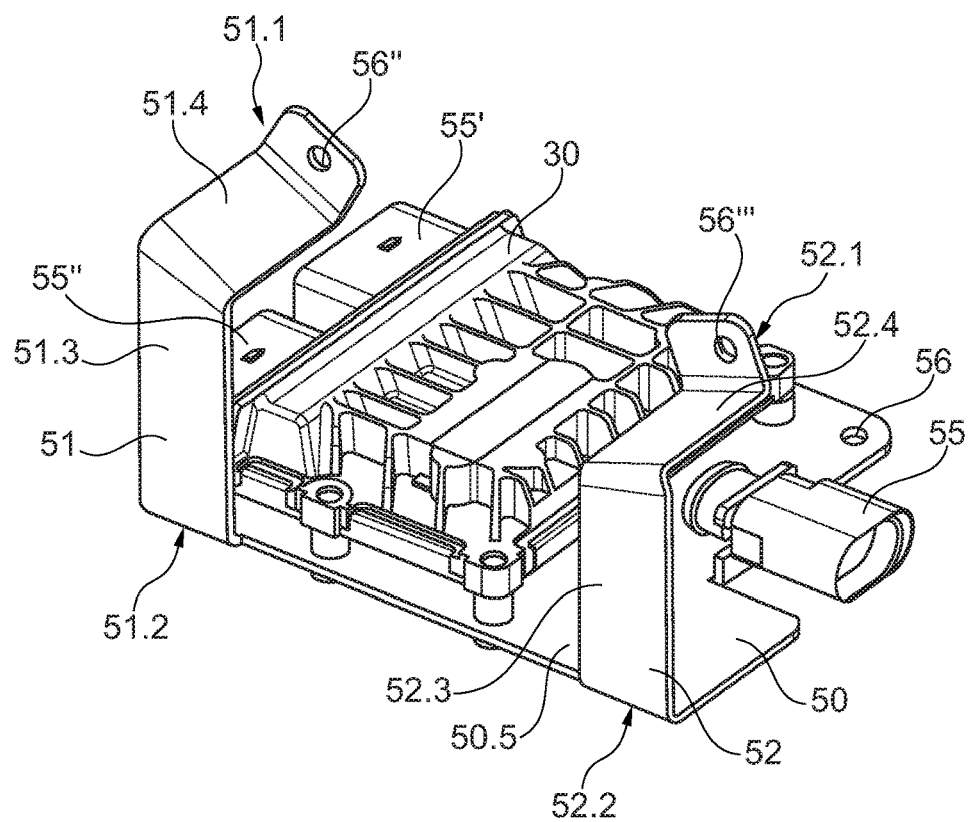
FIGS. 2A-2C a holder for a hybrid module according to the invention as shown e.g., in FIG. 1, with FIG. 2 showing the holder in a disassembled state.
Figure 2B:
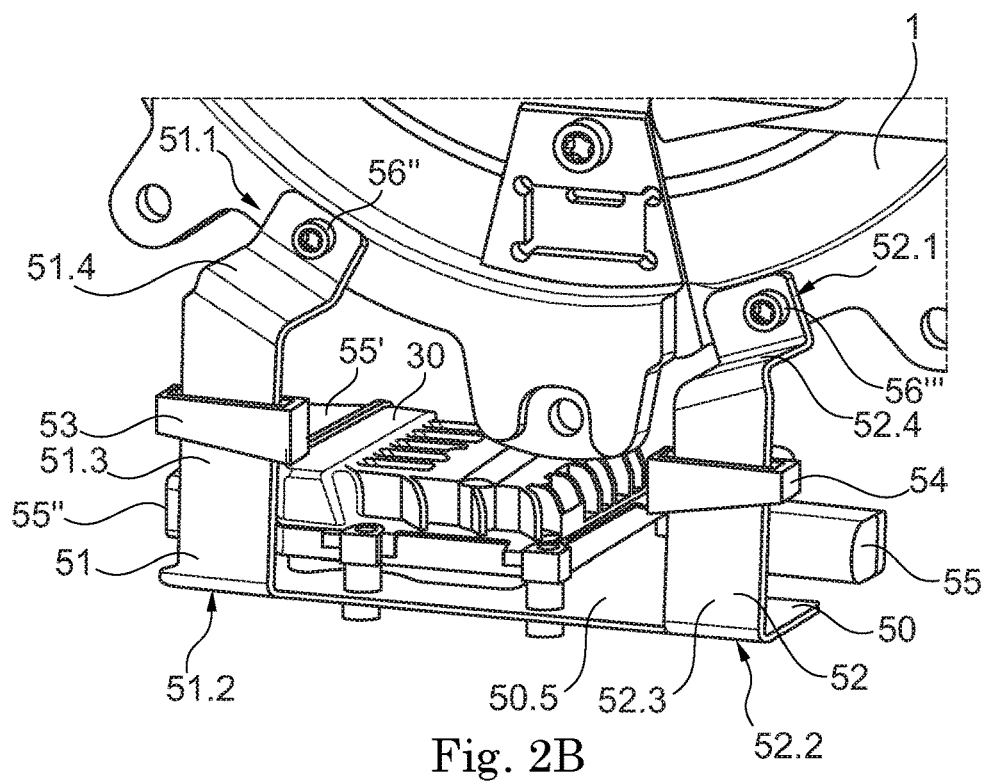
Figure 2C:
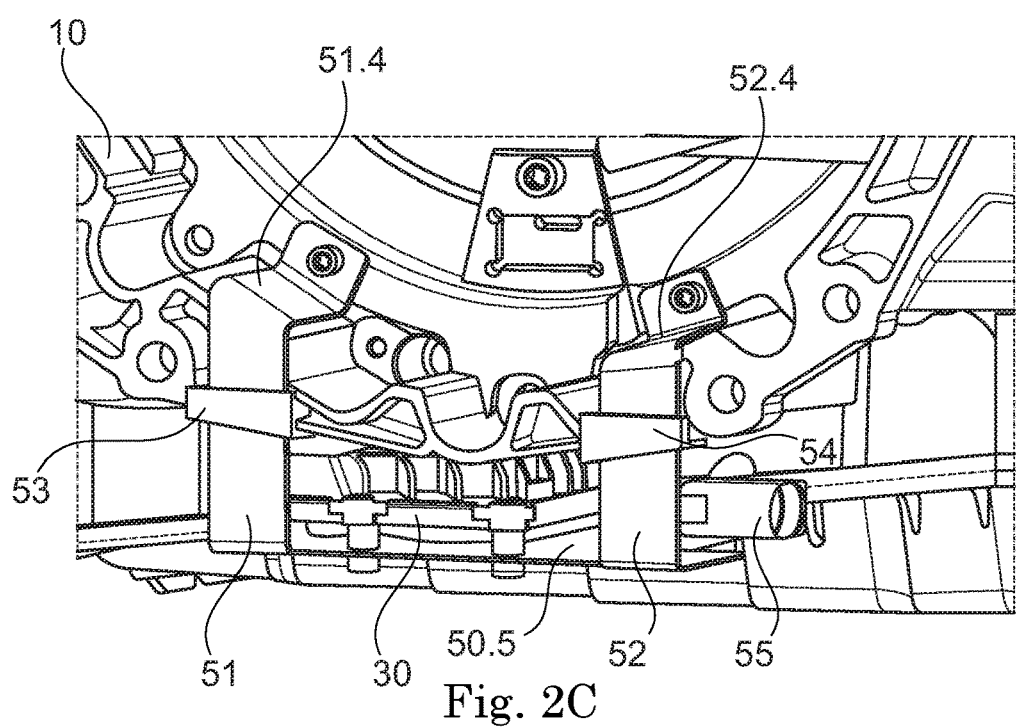

FIGS. 2A-2C show a holder 50 for a hybrid module 1 according to the invention, as shown e.g. in FIG. 1, with FIG. 2A showing the holder 50 in the unassembled state, FIG. 2 showing the holder 50 in the state preassembled with the hybrid module 1, and FIG. 2C showing the holder 50 in the state assembled in the transmission housing 10. The actuator electronics module 30 is fastened via the holder 50, the two braces 51, 52 with respectively one radially extending section 51.3, 52.3 at the hybrid module 1. The braces 51, 52 are fastened in one of their end sections 51.1, 52.1 at the hybrid module 1 and in their other end section 51.2, 52.2 at the actuator electronics module 30 via an assembly plate. This plate has a bore as a fastening option 56 for fastening at the transmission housing 10. The braces 51, 52 each have at one end section 51.1, 52.1 an axially extending section 51.4, 52.4 which transfers into the respectively radially extending section 51.3, 52.3. The holder 50 has radially outside the external perimeter of the hybrid module 1 an axially extending section 50.5 in which the respectively radially extending section 51.3, 52.3 merges and which is formed by the assembly plate. The braces 51, 52 each have a grommet 53, 54 which is arranged in the radially extending section 51.3, 52.3 of the braces 51, 52. Sockets 55, 55', 55" are arranged on the assembly plate as plug-in connection components.

The holder 50 is screwed via the two braces 51, 52 to the hybrid module 1 located inside and is made from sheet metal. Preferably cables are guided via the two braces 51, 52 towards the outside. Both the actuator electronics module 30 and the sensor plug 55 for the electric machine 4 are fastened at the assembly plate, which in the final assembled state is located outside the transmission bell, and which forms an axially extending section 50.5 of the holder 50. Both components are located in an area accessible for the final assembly.

FIG. 2B shows the position of the holder 50 at the hybrid module 1. It is screwed via the two braces 51, 52 to the fixed portion of the hybrid module 1. The positioning of the sheet metal on the hybrid module 1 is preferably performed by pins. Preferably the cables of the clutch actuator 21 and the sensors of the electric machine 40 (e.g., for temperature sensors—NTC and/or a resolver) are guided at one or both braces 51, 52 to the actuator electronics module 30.

Both braces 51, 52 are encased by a grommet 53, 54. The respective grommet 53, 54 has here both a sealing function in order to protect the interior chamber of the hybrid module 1 from contamination. On the other hand preferably all cables are guided through bores in one or both grommets 53, 54 and are this way protected from mechanic influences (chafing). The grommets can be fastened via undercuts or lugs at the sheet metal.

The hybrid module 1 is delivered as shown in FIG. 2B. This way both the actuator electronics module 30 as well as the sensor connector 55 are already fastened in their final position and all cables are laid to the hybrid module 1.

FIG. 2C shows the state of the hybrid module 1 in the condition inserted in the transmission housing 10. During the final assembly, after inserting the hybrid module 1 into the transmission housing, the installer only needs to plug in the plug of the wiring harness of the vehicle to the actuator electronics module 30 as well as the connector 55 for the sensors.

For the final fixation, after the insertion of the hybrid module 1 into the transmission housing 10, the holder 50 is fastened with two screws at the exterior of the transmission housing 10.

The holder 50 additionally protects the actuator electronics module 30 and the plug 55 from environmental influences, such as splashing water and soiling.

Figure 3A:
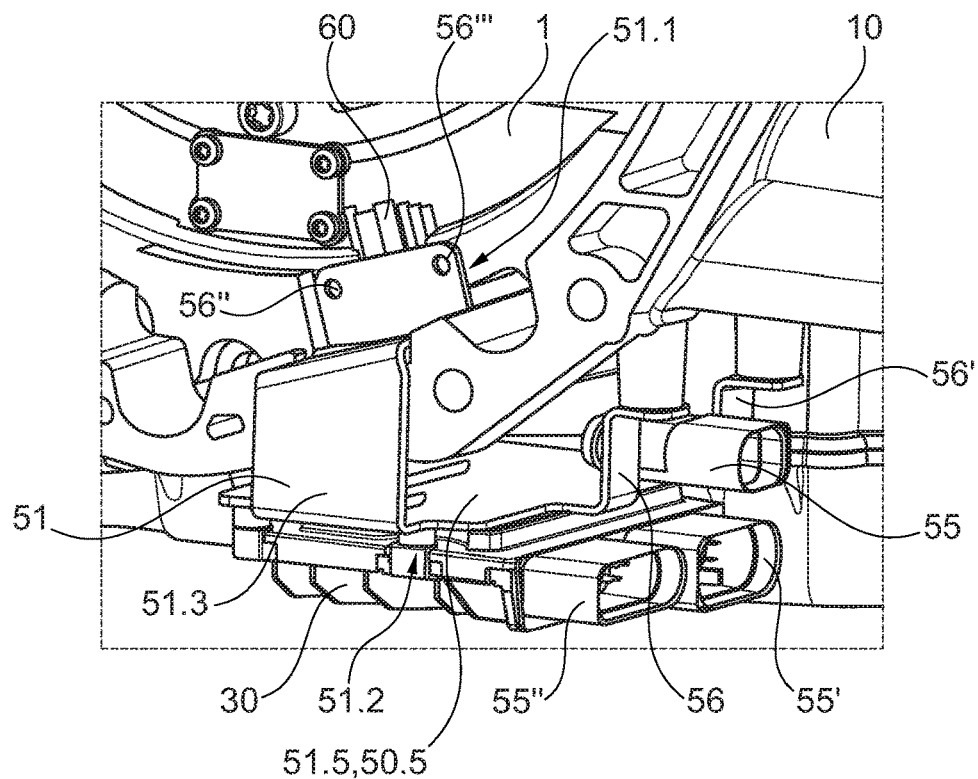
FIG. 3B shows a side view of the left side of the holder of FIG. 3A.
FIG. 3C shows a view of the right side of the holder of FIG. 3A.
Figure 3B:
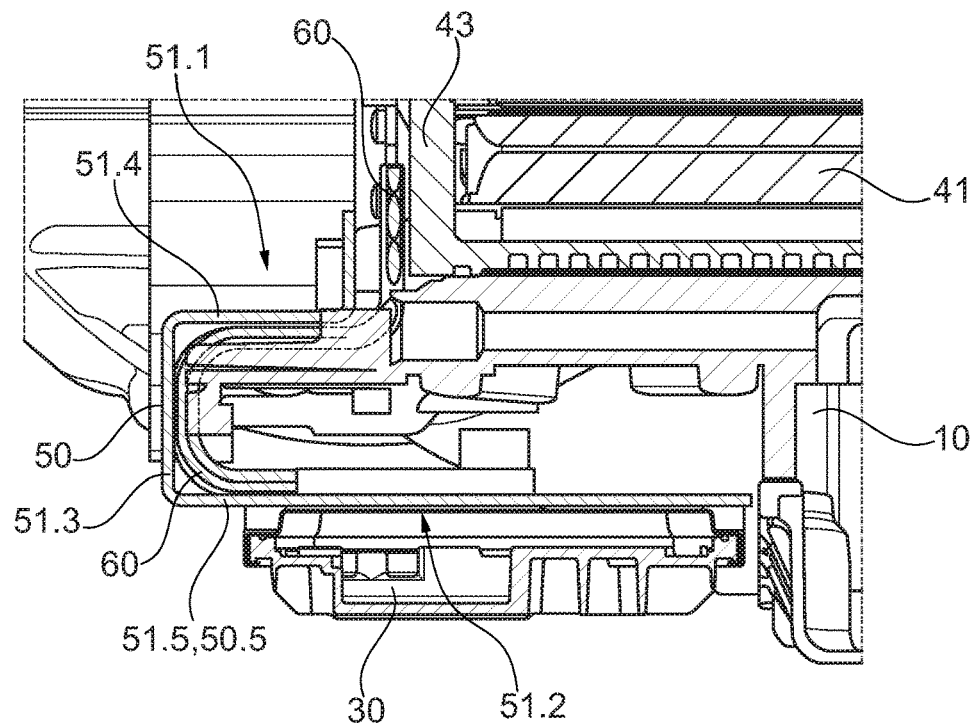
Figure 3C:
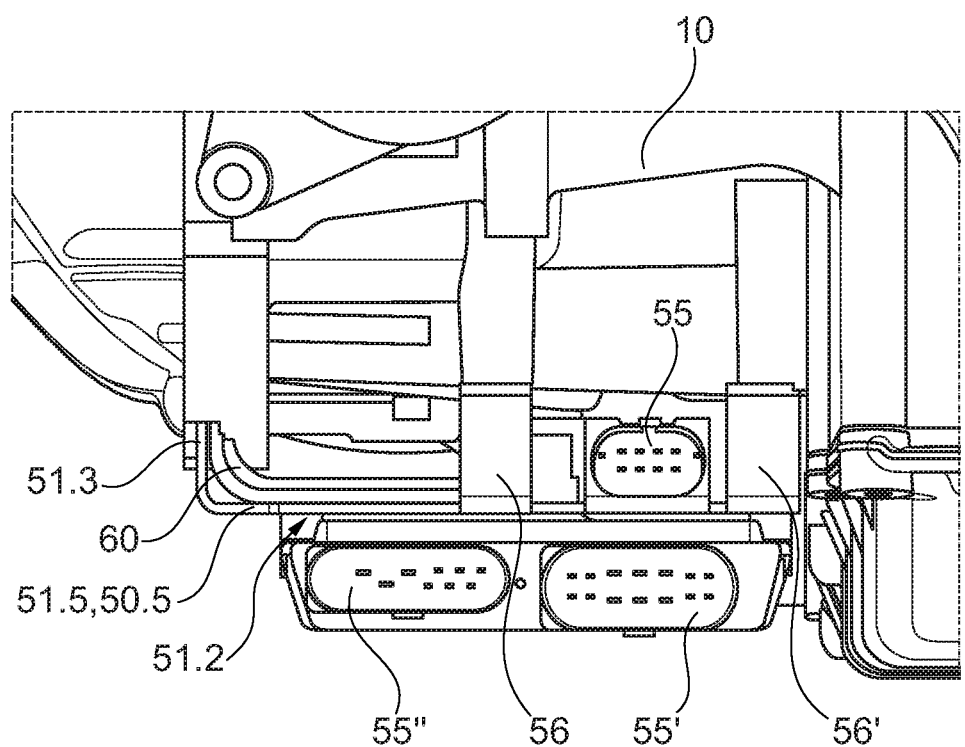

FIGS. 3A-3C show a holder 50 in the state assembled in the transmission housing 10 similar to the one in FIG. 2A-2C, however only with one brace 51, with FIG. 3A showing a perspective view of the holder 50 diagonally from the side of the internal combustion engine 2, FIG. 3B showing a side view of the left side of the holder 50 in FIG. 3A, and FIG. 3C showing a view of the right side of the holder 50 in FIG. 3A.

In this variant the holder 50 is guided with a single brace 51 out of the transmission housing 10. Here all cables 60 are laid under the brace 51 and are protected thereby from the rotating vibration damper, which is installed directly abutting this position. The holder 50 made from sheet metal is here connected with two screws at the cooling channel 43 of the electric machine 40, with the holder for this purpose comprising as fastening options 56", 56''' respective bores in the end section 51.1 at the side of the hybrid module, additionally having an angled section.

The actuator electronics module 30 and the sensor plug 55 are arranged over top of each other at the exterior of the transmission housing 10 so that the plug-in sockets 55' and 55' of the actuator electronics module 30 and the sensor plug 44 are located over top of each other. This reduces the space required and the counter plugs at the vehicle can be connected from the same side. The axially extending section 50.5 of the holder, which can also be considered as an expanded axially extending section 51.5 of the brace 51, shows fastening options 56, 56' for fastening at the transmission housing 10, which are respectively formed by a twice-angled sheet metal section with a bore.

By the actuator electronics module 30, fixed at the hybrid module and shown in FIGS. 1 to 3C, all low-voltage and sensor connections can be laid during the preassembly of an "insertable module". This leads to advantages for the allocation, the transportation, as well as the later final assembly by the installer.

The present invention provides that an actuator electronics module is connected to the hybrid module, preferably via at least one brace. The brace is here embodied suitably such that the cables can be guided along it in a secure fashion. The brace can be connected to a base plate and/or assembly plate or merge therewith, on which the electronic is fastened. A two-part embodiment of the actuator electronics module and a bottom/brace combination (terminal) is preferred. The sizing of at least one brace (e.g., two braces) is selected such that the base plate with the installed actuator electronics module shows one, preferably a radial distance from the hybrid module so that it can be inserted into a bell of the transmission housing and the power electronics is provided outside the transmission housing, preferably showing a housing part between the actuator electronics module and the hybrid module. The actuator electronics module and/or the base plate are preferably connected to the transmission housing.

LIST OF REFERENCE CHARACTERS

1 hybrid module
2 side towards the internal combustion engine
3 transmission side
4 radially extending wall
10 transmission housing
20 clutch
21 clutch actuator
30 actuator electronics module
40 electric machine
41 stator
42 rotor
43 cooling channel
50 holder
50.5 axially extending section of the holder
51 brace
51.1 end section of the brace
51.2 end section of the brace
51.3 radially extending section of the brace
51.4 axially extending section of the brace
51.5 axially extending section of the brace
52 brace
52.1 end section of the brace
52.2 end section of the brace
52.3 radially extending section of the brace
52.4 axially extending section of the brace
53 grommet of the brace 51
54 grommet of the brace 52
55 plug-in connection component
56 fastening option
60 cables

The invention claimed is:

1. A hybrid module having an engine side facing an internal combustion engine and a transmission side, the hybrid module comprising:
   a clutch with a clutch actuator, an electric machine, a radially extending wall, and an actuator electronics module which are preassembled to form the hybrid module,
   the actuator electronics module is preassembled with a holder with the hybrid module such that the actuator electronics module is radially distanced from a center of the hybrid module, and
   (a) the actuator electronics module is fastened on a first axial side of the radially extending wall, and (b) the clutch and the electric machine are arranged on a second axial side of the radially extending wall, the second axial side being opposite the first axial side,
   wherein the actuator electronics module is fastened via the holder, which comprises at least one brace with a radially extending section, to the hybrid module, with the brace being fastened at one end section thereof to the hybrid module and with another end section thereof connected to the actuator electronics module.

2. The hybrid module according to claim 1, wherein the other end section or the section of the holder adjoining thereto or the actuator electronics module comprises a fastener adapted for fastening to a transmission housing.

3. The hybrid module according to claim 1, wherein the brace comprises at the one end section an axially extending section which merges into the radially extending section.

4. The hybrid module according to claim 1, wherein the holder comprises radially outside an exterior perimeter of the hybrid module an axially extending section merging with the radially extending section.

5. The hybrid module according to claim 1, wherein the brace comprises a grommet.

6. The hybrid module according to claim 1, wherein at least one cable is laid along the brace from the hybrid module to the actuator electronics module.

7. The hybrid module according to claim 1, wherein at least one plug-in connection component is fastened at the other end section or at a section of the holder abutting thereto or at the actuator electronics module.

8. A drivetrain comprising a hybrid module according to claim 1, and a transmission housing, the hybrid module is arranged in a dry housing part of the transmission housing, at least a portion of the transmission housing axially encompasses at least a portion of the hybrid module, and the actuator electronics module connected to the hybrid module is radially distanced from the hybrid module so that at least a section of the transmission housing is located between the actuator electronics module and the hybrid module.

9. The hybrid module according to claim 1, wherein in an installed state within a transmission housing the radially extending wall forms a boundary of the transmission housing.

10. A hybrid module comprising:
    a radially extending wall including:
        a first axial side adapted for facing an internal combustion engine; and
        a second axial side adapted for facing a transmission, the second axial side being opposite the first axial side;

a clutch comprising a clutch actuator;
an electric machine; and
an actuator electronics module fixed to a holder;
wherein the holder is fixed to the first axial side of the radially extending wall such that the actuator electronics module is radially distanced from a center of the hybrid module,
the clutch and the electric machine are arranged on the second axial side of the radially extending wall, and
in an installed state of the hybrid module within a transmission housing, the radially extending wall forms a boundary of the transmission housing.

* * * * *